Patented July 24, 1928.

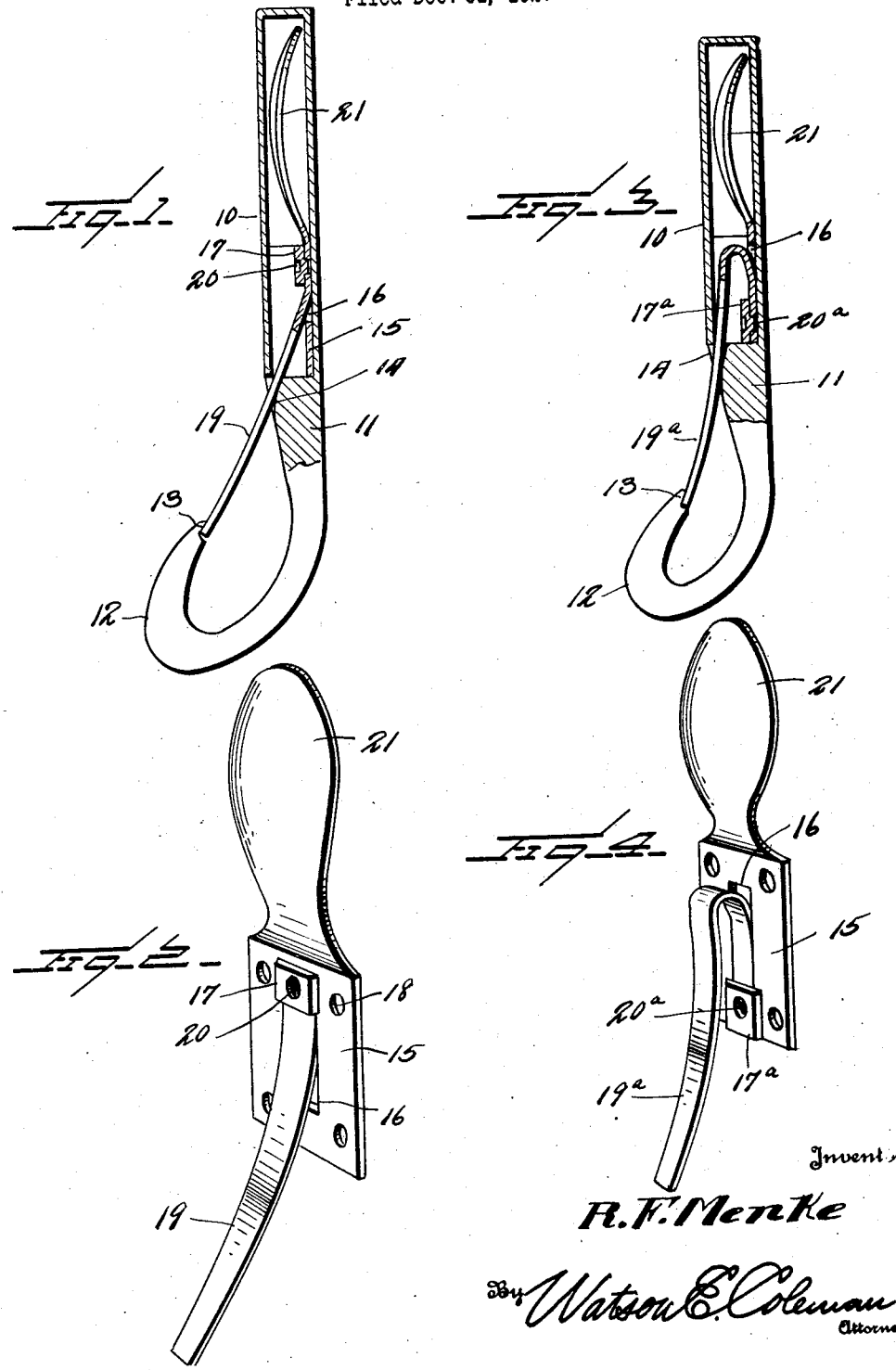

1,678,016

UNITED STATES PATENT OFFICE.

ROBERT F. MENKE, OF BESSMAY, TEXAS.

KEY-RING HOLDER.

Application filed December 31, 1927. Serial No. 243,955.

This invention relates to key ring holders, and particularly to key ring holders which are adapted to be disposed upon a belt.

The general object of the present invention is to provide a key ring holder of a very simple and effective form which is so constructed that it may be disposed upon a belt in any desired position and will retain this position upon the belt against slipping without, however, causing any undue wear on or any marring of the belt.

A further object is to provide a key ring holder having a snap hook within which the key ring may engage, the spring of the hook having its extremity disposed within a seat in the extremity of the bill of the hook.

A still further object is to so mount the spring of the snap hook that it cannot be broken or shifted but will retain its position under all circumstances.

Still another object is to provide a key ring holder comprising a belt-embracing loop, a snap hook extending therefrom, and provide a belt-retaining spring and a spring for the snap hook so engaged with each other and with the belt-receiving loop that these two springs cannot get out of place but will be held firmly at all times, the construction being such as to permit the ready assembling of the several elements in a thoroughly effective manner but at low cost.

Other objects will appear in the course of the following description.

My invention is illustrated in the accompanying drawing, wherein:—

Figure 1 is a longitudinal sectional view of a key ring holder constructed in accordance with my invention;

Figure 2 is a perspective view of the springs thereof;

Figure 3 is a vertical section of a modified form of the holder;

Figure 4 is a perspective view of the springs as arranged in this modified form.

Referring to this drawing, and particularly to Figures 1 and 2, 10 designates the belt-receiving loop which is preferably made of stainless steel or like material, which will be stamped from sheet metal and shaped with dies. To the open end of this belt-receiving loop there is attached, as by welding or any other suitable means, the cast metal or molded hook 11 having the bill 12, the extremity of this bill being recessed, as at 13, to form a seat. This hook extends downward and outward when the belt-receiving loop is disposed upon a belt so as to permit the easy withdrawal of the key ring therefrom. The base of the hook shank 11 is formed with a groove 14.

Disposed within the belt-receiving loop is the belt-retaining spring which is formed with a rectangular base 15 having a slot 16 cut therefrom, the material at the upper end of this slot being outwardly pressed, as at 17, constituting a retaining bridge, as it may be termed. This base is formed with four apertures 18 through which screws may be passed to attach the base to the inner wall of the belt-receiving loop. The outwardly deflected bridge portion 17 is also formed with a screw-threaded opening. The spring tongue 19 of the snap hook has a width equal to the slot 16 and the inner end of this spring tongue is forced beneath the outwardly bent bridge portion 17 within which it snugly fits and is held in place by a screw 20 passing through this bridge portion and the spring. This spring, it will be seen, extends outward and downward and extends through the groove 14 so that the spring is thus held firmly in place against any lateral movement and with the extremity of the spring normally disposed within the seat 13.

The base 15 is upwardly and outwardly extended to form a longitudinally rounded belt-retaining spring proper 21. This is preferably relatively thick and strong and has an outwardly rounded or rounded outer face which normally bears against the outer wall of the belt-receiving loop 10, there being a space between the extremity of this spring 21 and the inner wall of the loop so that this spring may be forced inward when a belt is inserted between the spring and the loop. These springs 19 and 21 will be first stamped from annealed sheet spring steel and given their proper shape and then tempered. The belt-retaining spring 21 is designed to exert just enough tension or pressure on the inner side of the belt to cause the loop to stay at any point to which it may be placed and where it will be most convenient to the wearer. This spring prevents slipping back and forth of the belt loop upon the belt and prevents the device from slipping off the belt at any time when the belt is unbuckled. I have very severely tested the spring 19 as constructed as shown in Figure 2 and find that this spring will never break, that all side play is eliminated, and that it cannot come loose through wear and tear, as it is riveted to the belt-retaining spring itself. This device, when assembled and complete, is compact, with every part rigid and sufficiently strong to withstand any strains or shocks to which it may be subjected. With the exception of the two springs, it is to be made of stainless, rust-proof steel, thus eliminating the necessity of nickeling and preventing rust where it comes in contact with perspiration.

In Figures 3 and 4, I show another form of the device in which the spring 19 has been slightly modified and in which the support for the spring is also somewhat modified. In this case, the slot 16ª in the base 15 is formed at its lower end with the transversely arched bridge 17ª and the spring 19ª at its rear end is re-curved upon itself and the forward end of this re-curved portion is disposed beneath the bridge portion 17ª and is held in place by the screw 20ª. Here again the spring 19ª has a width exactly the same as the slot 16 and the tang of the spring extends up through the groove 14 formed in the shank 11 of the snap hook 12. Otherwise than this, the construction is the same as previously described and the same reference numerals have been used therefor. The same advantages are present in the construction shown in Figures 3 and 4 as in Figures 1 and 2.

Obviously, minor modifications might be made in the details of construction and arrangement of parts without departing from the spirit of the invention as defined in the appended claims.

I claim:—

1. A key ring holder of the character described comprising a belt loop, a snap hook extending from one end of the belt loop and having a returned bill, a belt-retaining spring disposed within the belt loop, the spring having a base fitting within the belt loop adjacent the snap hook and attached to the belt loop, said base being formed with an integral, longitudinally extending, outwardly curved belt-retaining spring.

2. A key ring holder of the character described comprising a belt loop, a snap hook extending from one end of the belt loop and having a returned bill, a belt-retaining spring disposed within the belt loop, the spring having a base fitting within the belt loop adjacent the snap hook and attached to the belt loop, said base being formed with an integral, longitudinally extending, outwardly curved belt-retaining spring, and a spring tongue coacting with the returned end of the snap hook, the inner end of said spring tongue extending into the belt-receiving loop and being operatively engaged with the said base and held from lateral movement thereby.

3. In a key ring holder, a belt-receiving loop, a snap hook extending therefrom and having a returned bill, the shank of the hook at its junction with the loop being formed with a groove, a member disposed within the loop and having a longitudinally extending slot and an outwardly deflected, transversely extending bridge portion, and a spring having a width equal to the slot and fitting in said slot and having one end disposed beneath said bridge portion, the other end of the spring extending out through said groove and engaging the bill of the hook.

4. In a key ring holder, a belt-receiving loop, a snap hook extending therefrom and having a returned bill, the shank of the hook at its junction with the loop being formed with a groove, a member disposed within the loop and having a longitudinally extending slot and an outwardly deflected, transversely extending bridge portion, and a spring having a width equal to the slot and fitting in said slot and having one end disposed beneath said bridge portion, the other end of the spring extending out through said groove and engaging the bill of the hook, said base having formed integrally therewith a longitudinally extending, outwardly curved, belt-retaining spring resiliently urged against the outer wall of said belt-receiving loop.

5. A key ring holder comprising a belt-receiving loop, a longitudinally and outwardly curved hook connected thereto and having a returned bill recessed at its extremity, the base of said hook being formed with a groove, a belt-retaining spring, an integral base disposed within the belt-receiving loop, the base being rectangular in form and having a longitudinally extending slot formed at one end with an outwardly deflected, transversely extending portion, the belt-retaining spring proper extending longitudinally from said base and being outwardly bowed toward the front wall of the key-receiving loop, a spring for said hook having its inner portion disposed within and fitting said slot and its adjacent extremity disposed beneath the outwardly deflected portion, the other extremity of the spring engaging in said recess or seat in the extremity of the bill, a screw passing through the outwardly deflected portion of the base and into said last named spring, and means holding the base to the inner wall of the spring-receiving loop.

6. A key ring holder of the character described having a belt-receiving loop and a hook extending therefrom, a belt-retaining spring disposed within the loop and having a base operatively engaged therewith, and a spring for the hook, the base being provided with a slot and a portion arching over the slot, the end of the spring being inserted within the slot and beneath said arching over portion.

7. A key device of the character described comprising a hook having a shank and a spring for the hook, the shank being formed to provide a longitudinally extending slot with a member arching over the slot, one end of the spring being inserted into said slot and beneath said member and being engaged with the member.

In testimony whereof I hereunto affix my signature.

ROBERT F. MENKE.